United States Patent
Mohanty et al.

(10) Patent No.: US 11,989,287 B2
(45) Date of Patent: May 21, 2024

(54) APPLICATION PROGRAMMING INTERFACE ANOMALY DETECTION

(71) Applicant: Dell Products L.P., Round Rock, TX (US)

(72) Inventors: Bijan Kumar Mohanty, Austin, TX (US); Manoj Nambirajan, Hyderabad (IN); Mohit Kumar Agarwal, Bangalore (IN); Hung Dinh, Austin, TX (US); Harish Mysore Jayaram, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 329 days.

(21) Appl. No.: 17/502,169

(22) Filed: Oct. 15, 2021

(65) Prior Publication Data
US 2023/0124166 A1 Apr. 20, 2023

(51) Int. Cl.
| | |
|---|---|
| *G06F 21/55* | (2013.01) |
| *G06F 9/54* | (2006.01) |
| *G06F 11/34* | (2006.01) |
| *G06F 18/2433* | (2023.01) |
| *G06N 20/20* | (2019.01) |

(52) U.S. Cl.
CPC .......... *G06F 21/552* (2013.01); *G06F 9/547* (2013.01); *G06F 11/3466* (2013.01); *G06F 18/2433* (2023.01); *G06F 21/554* (2013.01); *G06N 20/20* (2019.01)

(58) Field of Classification Search
CPC .. G06F 21/552; G06F 21/554; G06F 18/2433; G06F 9/547; G06F 11/3466; G06N 20/20
See application file for complete search history.

(56) References Cited

U.S. PATENT DOCUMENTS

| | | | |
|---|---|---|---|
| 2019/0114417 A1* | 4/2019 | Subbarayan | H04L 41/145 |
| 2020/0220875 A1* | 7/2020 | Harguindeguy | H04L 63/101 |
| 2022/0210172 A1* | 6/2022 | Tan | G06F 21/554 |

OTHER PUBLICATIONS

Wikipedia, "Isolation Forest," https://en.wikipedia.org/w/index.php?title=Isolation_forest&oldid=1029032059, Jun. 17, 2021, 7 pages.

* cited by examiner

*Primary Examiner* — Azizul Choudhury
(74) *Attorney, Agent, or Firm* — Ryan, Mason & Lewis, LLP

(57) ABSTRACT

A method comprises collecting parameters corresponding to processing by a first application programming interface of at least one application programming interface transaction, analyzing the parameters using one or more machine learning algorithms, and predicting, based at least in part on the analyzing, whether the at least one application programming interface transaction is anomalous. In the method, the first application programming interface is designated as being in an anomalous state responsive to predicting that the at least one application programming interface transaction is anomalous. One or more application programming interface requests for the first application programming interface are routed to a second application programming interface responsive to the anomalous state designation.

20 Claims, 10 Drawing Sheets

```
// Check state value and forward the request to Primary or Secondary end point If (API_state == 0):
    // Call Primary API endpoint
    // Calculate response time of API from Request time and Reply time // Check if response time has exceeded API response threshold value
    If (response_time > response_time_threshold):
        // Pass response time and other API metrics to API Anomaly Prediction engine
        If (anomaly predicted):
            //Increment Anomaly counter
            anomaly_counter ++

// Set last_anomaly_time to current time

// anomaly counter reaches threshold value,
            // set the state of API to ANOMALOUS
            if (anomaly_counter >= anomaly_threshold):
                API_state = 1   // API state is set to anomalous
```

FIG. 5

```
elif (API_state == 1):
    // API state is ANOMALOUS, check if the last anomaly time has exceeded the threshold time
    If (current_date_time > last_anomaly_time + threshold_time):
        // Set API state to RETRY
        API_state = 2

// Exit out the loop and continue to get to the RETRY loop

// Call Secondary API endpoint else:
    // API state is RETRY
    // Call Primary API endpoint
    // Calculate response time of API from Request time and Reply time
    // Pass response time and other API metrics to API Anomaly Prediction engine If (anomaly predicted):
        //Increment Anomaly counter
        anomaly_counter ++

//Set API state to ANOMALOUS
        API_state = 1 else:
        // Normal situation observed, set state to NORMAL
        API_state = 0

// Reset Anomaly counter
        anomaly_counter = 0
```

FIG. 5 (cont'd)

APPLICATION PROGRAMMING INTERFACE ANOMALY DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to application programming interface (API) management.

BACKGROUND

Enterprises with complex information technology (IT) systems rely on a multitude of software applications. Integration of the applications and passage of data between the applications is accomplished by using application programming interfaces (APIs). The APIs can be implemented on top of other systems and the behavior of the APIs can be directly impacted by the runtime states of the applications and associated components such as, for example, databases.

When an underlying application that implements an API has issues or outages, the behavior of the API can be adversely impacted. Resource issues such as, for example, high central processing unit (CPU) utilization, high memory utilization, high volumes of input/output (IO) operations and thread locking can directly impact the response time of an API or cause the API to time out. Resource issues may also cause the API and the implementing application to return errors. Conventional approaches often fail to determine API issues or outages in advance of their occurrence and often fail to adequately handle API problems when they occur.

SUMMARY

Embodiments provide an API anomaly detection and resolution platform in an information processing system.

For example, in one embodiment, a method comprises collecting parameters corresponding to processing by a first application programming interface of at least one application programming interface transaction, analyzing the parameters using one or more machine learning algorithms, and predicting, based at least in part on the analyzing, whether the at least one application programming interface transaction is anomalous. In the method, the first application programming interface is designated as being in an anomalous state responsive to predicting that the at least one application programming interface transaction is anomalous. One or more application programming interface requests for the first application programming interface are routed to a second application programming interface responsive to the anomalous state designation.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts example pseudocode for implementing a state designation layer of a broker engine in an illustrative embodiment.

DETAILED DESCRIPTION

Figure 1:
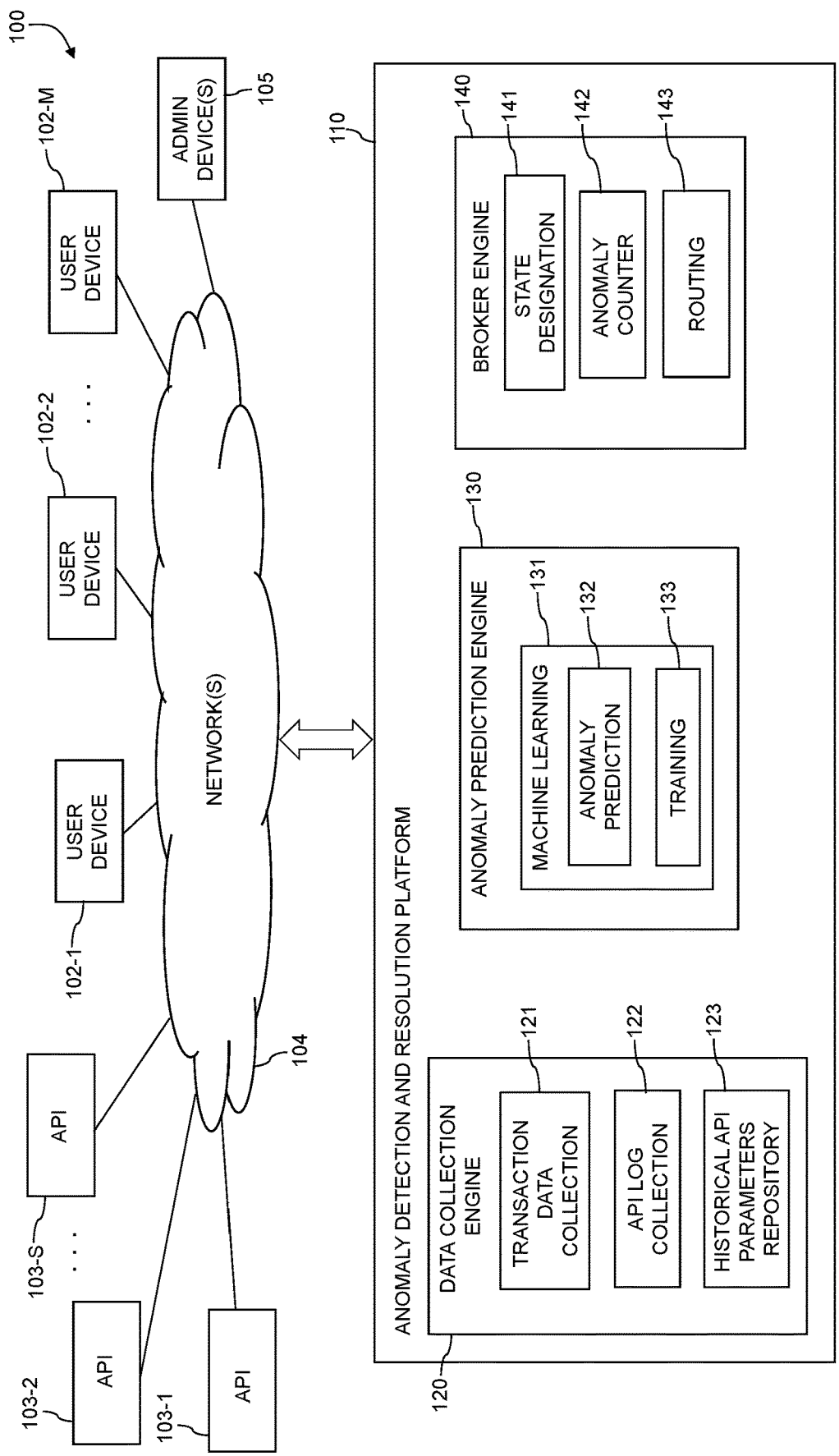
FIG. 1 depicts an information processing system with an anomaly detection and resolution platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. As noted herein, APIs are used to integrate and pass data between applications, and may be implemented on top of other systems.

FIG. 1 shows an information processing system 100 configured in accordance with an illustrative embodiment. The information processing system 100 comprises user devices 102-1, 102-2, ... 102-M (collectively "user devices 102"), application programming interfaces (APIs) 103-1, 103-2, ... 103-S (collectively "APIs 103"), and one or more administrator devices ("Admin device(s)") 105. The user devices 102, APIs 103 and administrator devices 105 communicate over a network 104 with an anomaly detection and resolution platform 110. The variable M and other similar index variables herein such as K, L and S are assumed to be arbitrary positive integers greater than or equal to two.

The user devices 102 and administrator devices 105 can comprise, for example, Internet of Things (IoT) devices, desktop, laptop or tablet computers, mobile telephones, or other types of processing devices capable of communicating with the anomaly detection and resolution platform 110 over the network 104. Such devices are examples of what are more generally referred to herein as "processing devices." Some of these processing devices are also generally referred to herein as "computers." The user devices 102 and administrator devices 105 may also or alternately comprise virtualized computing resources, such as virtual machines (VMs), containers, etc. The user devices 102 and/or administrator devices 105 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. Anomaly detection and resolution services may be provided for users utilizing one or more machine learning models, although it is to be appreciated that other types of infrastructure arrangements could be used. At least a portion of the available services and functionalities provided by the anomaly detection and resolution platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the anomaly detection and resolution platform 110, as well as to support communication between the anomaly detection and resolution platform 110 and connected devices (e.g., administrator devices 105) and/or other related systems and devices not explicitly shown.

In some embodiments, the administrator devices 105 are assumed to be associated with repair technicians, system administrators, information technology (IT) managers, software developers, release management personnel or other authorized personnel configured to access and utilize the anomaly detection and resolution platform 110.

The APIs 103 comprise subroutine definitions, protocols, and/or tools for building software. The APIs 103 define communication between software components, are used to integrate and pass data between applications, and may be implemented on top of other systems. The APIs 103 may be found on the user devices 102, administrator devices 105 and/or on one or more processing devices or virtualized computing resources other than the user devices 102 or administrator devices 105.

System behavior (e.g., transactional system behavior) is not always constant, and instead varies depending, for example, on the day of the week and time of year. A variety of factors can impact the performance and latency of the APIs 103 and their underlying implementing systems. For example, API performance can be impacted by the volume of transactions, numbers of users, amounts of database load, other prescheduled jobs running at the same time, etc. These factors may vary over the course of, for example, a day, week or month. Other factors that can affect API performance include, but are not necessarily limited to, increased seasonal load (e.g., Black Friday and other holiday sales), extract, transform and Load (ETL) processing, batch jobs running at certain times, and an underperforming database. As a result, many enterprises often grapple with slow APIs, API call time-outs, unresponsive user interfaces, and reduced customer satisfaction.

Conventional approaches are reactive in nature when attempting to address API performance issues. Many enterprises attempt to handle API issues after they result in outages. Advantageously, illustrative embodiments are proactive in nature, providing techniques to use machine learning to predict anomalies in API behavior and to adequately respond when such anomalies are predicted. Once anomalous behavior is identified in connection with an API (e.g., one of the APIs 103), the embodiments proactively switch operations to another API (e.g., another one of the APIs 103) prior to the occurrence of any issues. The embodiments provide a predictive and proactive framework for API issues. The framework is configured to predict API performance issues based on advanced detection of anomalies in API behavior. By leveraging a large amount of historical data for each of a plurality of APIs 103 in normal situations and utilizing an unsupervised machine learning model, anomalous or outlier API behavior is predicted. Using the historical dataset, the machine learning model learns responses and latency for each API 103 in normal situations and identifies anomalous behavior when the API metrics deviate from what has been learned as being normal. The framework is also configured to redirect API requests to alternate (e.g., secondary) APIs upon determining that the state of a primary API is anomalous.

The anomaly detection and resolution platform 110 in the present embodiment is assumed to be accessible to the user devices 102, APIs 103 and/or administrator devices 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the anomaly detection and resolution platform 110 includes a data collection engine 120, an anomaly prediction engine 130 and a broker engine 140. The data collection engine 120 includes a transaction data collection layer 121, an API log collection layer 122 and a historical API parameters repository 123. The anomaly prediction engine 130 includes a machine learning layer 131 comprising anomaly prediction and training layers 132 and 133. The broker engine 140 includes a state designation layer 141, an anomaly counter 142 and a routing layer 143.

The transaction data collection layer 121 of the data collection engine 120 collects parameters corresponding to processing by the APIs 103 of API transactions. The parameters may be collected from the APIs 103 and/or from applications used for monitoring API metrics, such as, for example, Elasticsearch®, Logstash® and Kibana® (ELK), Splunk® and other monitoring tools. The parameters comprise, for example, API identifiers (e.g., API names), API request time and/or date, API response time and/or date and differences between request and response times. Other parameters can include, for example, user information, error information and input/output (IO) parameters (e.g., throughput, IO operations per second (IOPS), latency). As used herein, "API transactions" or "transactions" are to be broadly construed and refer to, for example, API operations initiated by, for example, a request or call to an API. The API operations include, but are not necessarily limited to, read operations, write operations and/or subroutines used to, for example, integrate and pass data between applications. The transaction data collection layer 121 collects current or real-time API transaction data for API operations which are in progress or have been recently completed (e.g., within microseconds or milliseconds). As explained in more detail herein, the collected transaction data, including the corresponding parameters, is inputted to the anomaly prediction engine 130 to assess whether the transactions are anomalous and whether there is an issue with an API 103.

The API log collection layer 122 collects historical API parameters similar to those collected by the transaction data collection layer 121 such as, for example, API identifiers, API request time and/or date, API response time and/or date, differences between request and response times, user information, error information and input/output (IO) parameters (e.g., throughput, IO operations per second (IOPS), latency). The historical API parameters may be collected from the APIs 103 and/or from applications used for monitoring API metrics, such as, for example, the monitoring tools mentioned herein above, which log API and application activity. The historical API parameters relating to normal API operations (e.g. when an API is operating without any issues or problems) are stored in the historical API parameters repository 123 and input to the anomaly prediction engine 130 to be used as training data by the training layer 133. The historical API parameters relating to normal API operations are used to train the machine learning models used by the anomaly prediction layer 132 to learn which parameters correspond to normal operation of the respective APIs 103.

The anomaly prediction engine 130, more particularly, the anomaly prediction layer 132 of the machine learning layer 131, analyzes the parameters collected by the transaction data collection layer 121 using one or more machine learning algorithms, and predicts, based at least in part on the analyzing, whether API transactions being executed by the APIs 103 are anomalous. For example, under normal operating conditions, each API 103 may have a specific response time that can vary between the APIs 103. During issues, outages and/or overloaded situations, the response times may vary, and may be considered as outliers or anomalies by the anomaly prediction layer 132. The anomaly prediction layer 132 analyzes the parameters collected by the transaction data collection layer 121 to identify abnormal patterns in the data to determine outliers. For example, based on historical parameter data, the training layer 133 trains the machine learning model to identify what constitutes normal operational parameters in APIs 103. Deviations from normal operations found in, for example, real-time API invocation metrics, are considered anomalies by the anomaly prediction layer 132.

The anomaly prediction layer 132 leverages an unsupervised learning approach and machine learning models to detect anomalies in the APIs 103 to accurately predict outages. By predicting a potential outage before it occurs, the anomaly prediction layer 132 provides a basis for a decision by the broker engine 140 to designate a state of an API 103 as anomalous and route API requests to a different one of the APIs 103, thus proactively eliminating the effects of an outage prior to a failure and enabling correction of problems with APIs without any service interruptions. As explained further herein, some of the APIs 103 connected to the anomaly detection and resolution platform 110 operate as primary APIs, while other ones of the APIs 103 operate as secondary APIs. According to an embodiment, the primary APIs are first options to respond to API calls or requests, and the parameters collected from the primary APIs in connection with responding to the API calls or requests are analyzed by the anomaly prediction engine 130 to determine if there are any anomalies. If a primary API is designated as anomalous, API requests are routed to a secondary API. As explained in more detail herein, in accordance with one or more embodiments, data corresponding to the operation of the primary APIs is stored, and the stored data is used to generate respective secondary APIs that can function in place of respective ones of the primary APIs.

Based, at least in part, on inputs from the anomaly prediction engine 130 comprising determinations of whether API transactions are anomalous, a state designation layer 141 of the broker engine 140 determines whether an API 103 (e.g., a primary API) should be designated as being in an anomalous state. According to an embodiment, the broker engine 140 maintains one or more flags to store states of respective ones of a plurality of APIs 103. In a normal condition for a given API, the flag is set to NORMAL and the routing layer 143 directs all calls to the API to the given API. The flag may be set to ANOMALOUS when the machine learning model of the anomaly prediction engine 130 determines that API transactions corresponding to the given API are anomalous. When the flag is set to ANOMALOUS, the routing layer 143 direct all calls to the given API to a secondary API. As explained in more detail herein, in one or more embodiments, an API is not designated as anomalous until a threshold consecutive number of API transactions associated with the given API (recorded by the anomaly counter 142) have been predicted as anomalous.

The broker engine 140 can be implemented as a centralized, static component for multiple APIs 103 (e.g., as a gateway pattern) or as one broker for respective ones of the APIs 103 (e.g., as a proxy pattern). The state designation layer 141 manages the flags to maintain the state of APIs so that routing can be performed by the routing layer 143 to the appropriate endpoints.

Figure 2:
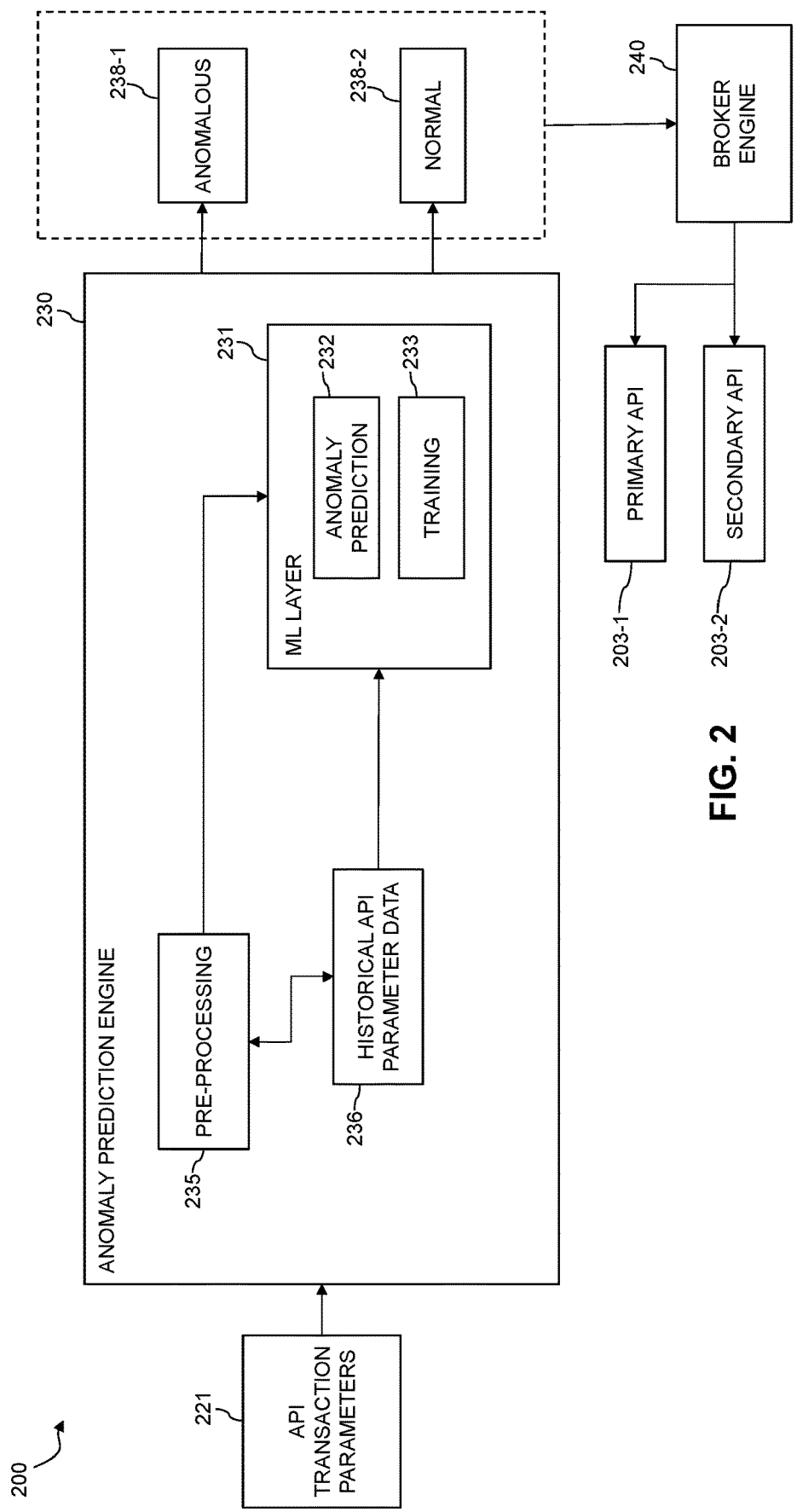
FIG. 2 depicts an operational flow for API anomaly prediction and API routing in an illustrative embodiment.

Referring to the operational flow 200 in FIG. 2, API transaction parameters 221 collected by, for example, a transaction data collection layer (e.g., transaction data collection layer 121) are input to the anomaly prediction engine 230, which is the same or similar to the anomaly prediction engine 130. The anomaly prediction engine 230 illustrates a pre-processing component 235, which processes the incoming API transaction parameters and the historical API parameter data 236 for analysis by the machine learning (ML) layer 231. For example, the pre-processing component 235 removes any unwanted characters, punctuation, and stop words. As can be seen in FIG. 2, the anomaly prediction engine 230 analyzes the incoming API transaction parameters 221 using an ML layer 231 comprising anomaly prediction and training layers 232 and 233. The ML layer 231 is the same or similar to machine learning layer 131. Based on the analysis, the anomaly prediction layer 232 determines, based on the transaction parameters, whether a transaction for a given API is anomalous 238-1 or normal 238-2.

The ML layer 231 leverages unsupervised learning methodology for outlier detection of the behavior of the APIs 103. In an embodiment, the machine learning layer 231 (or 131) implements multivariate anomaly detection using an isolation forest algorithm, which does not require labeled training data. The isolation forest algorithm identifies anomalies among the normal observations, by setting up a threshold value in a contamination parameter that can apply for real-time predictions. The isolation forest algorithm has the capacity to scale up to handle extremely large data sizes (e.g., terabytes) and high-dimensional problems with a large number of attributes, some of which may be irrelevant and potential noise. The isolation forest algorithm has relatively low linear time complexity and prevents masking and swamping effects in anomaly detection. A masking effect is where a model predicts normal behavior when the behavior is anomalous. A swamping effect is where a model predicts anomalous behavior when the behavior is normal.

Figures 3A, 3B:
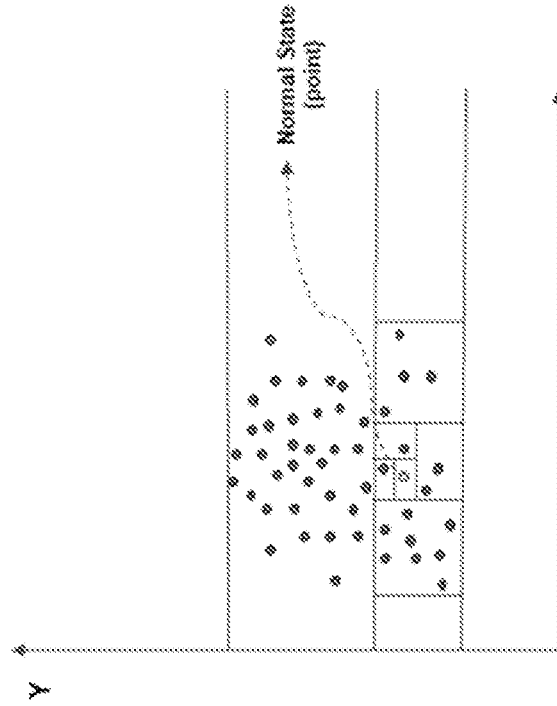
FIG. 3A depicts a plot illustrating isolation of a normal state point in an illustrative embodiment.
FIG. 3B depicts a plot illustrating isolation of an anomalous state point in an illustrative embodiment.

In illustrative embodiments, the machine learning model used by the ML layer 231 (or 131) isolates an anomaly by creating decision trees over random attributes. This random partitioning produces significantly shorter paths since fewer instances of anomalies result in smaller partitions, and distinguishable attribute values are more likely to be separated in early partitioning. As a result, when a group (e.g., forest) of random trees collectively produces shorter path lengths for some particular points, then they are highly likely to be anomalies. A larger number of splits are required to isolate a normal point, while an anomaly can be isolated by a shorter number of splits. For example, referring to the plots 301 and 302 in FIGS. 3A and 3B, a normal state point is isolated with 10 splits and an anomalous state point is isolated with four splits. The splits are shown as horizontal and vertical lines in the plot of points. The number of splits determine the level at which the isolation occurred and is used by the anomaly prediction layer 232 (or 132) to generate an anomaly score. The process is repeated multiple number of times and the isolation level of each point is noted. Once an iteration is completed, the anomaly score of each point/instance suggests the likeliness of an anomaly. The score is a function of the average level at which the point is isolated. The top points/instances having an anomaly score exceeding a threshold are labeled as anomalies by the anomaly prediction layer 232 (or 132). Alternatively, the ML layer 231 (or 131) uses supervised learning models such as, for example, support vector machines (SVMs) or neural networks.

In illustrative embodiments, the transaction data collection layer 121 collects API transaction parameters, and inputs the collected parameters to the anomaly prediction engine 130 (or 230) to perform anomaly prediction. The machine learning model (e.g., isolation forest model) is trained using historical parameter data (e.g., historical API parameter data 236). If the anomaly prediction layer 132 (or 232) identifies parameter values deviating from typical values for a given API and/or having an anomaly score exceeding a threshold, the anomaly prediction layer 132 (or 232) identifies a transaction associated with a given API as anomalous (e.g., anomalous 238-1). If the anomaly prediction layer 132 (or 232) identifies parameter values consistent with typical values for a given API and/or having an anomaly score less than a threshold, the anomaly prediction layer 132 (or 232) identifies a transaction associated with a given API as normal (e.g., normal 238-2).

As further depicted in FIG. 2, the predicted transaction state is transmitted to a broker engine 240 (which is the same or similar to the broker engine 140). The broker engine 240 designates an API as being in an anomalous or normal state, and routes subsequent API requests to a primary API 203-1 or a secondary API 203-2 based on the designation. As noted herein, according to one or more embodiments, a single instance of an anomalous transaction for a specific API does not give rise to an anomalous API designation. Instead, once a configurable threshold number of consecutive anomalous transactions for the same API is reached, the API will be designated as anomalous, so that all subsequent requests for that API will be routed to a secondary/back-up API. The broker engine 140 (or 240) performs the tasks required to transfer API requests from a primary API 203-1 that is predicted to fail to a fail-over API (e.g., secondary API 203-2) so that transactional integrity, continued API performance and quality of service are maintained. According to an embodiment, once an anomalous state is designated, the broker engine 240 sends an alert or notification to one or more administrator devices (e.g., administrator devices 105) so that users (e.g., operational team members) may initiate an investigation of the potential API issue.

The state designation layer 141 of the broker engine 140 determines whether to route an API request to a primary API or a secondary API based on an input from the anomaly prediction engine 130, and a routing layer 143 forwards the request to the appropriate end point. The broker engine 140 utilizes a circuit breaker configuration where, for example, a circuit of the broker engine 140 is closed during normal operation and open when an API is designated as being in an anomalous state. When a normal (e.g., non-anomalous) state is designated, API requests are forwarded to the primary API. When an anomalous state is designated, API requests are forwarded to the secondary API.

The anomaly counter 142 of the broker engine 140 tracks a number of anomalous transactions corresponding to a particular API. For example, when an API transaction is predicted as anomalous by the anomaly prediction engine 130, the anomaly counter 142 begins a new count of anomalous transactions if the transaction is a first transaction predicted to be anomalous for the particular API. The anomaly counter 142 also begins a new count of anomalous transactions if the transaction is a first transaction predicted to be anomalous for a particular API after a normal transaction for that API. Consecutive anomalous transactions for a given API increment the anomaly count for the given API, while normal a transaction for the given API resets the anomaly count to 0 for the given API.

Figure 4:
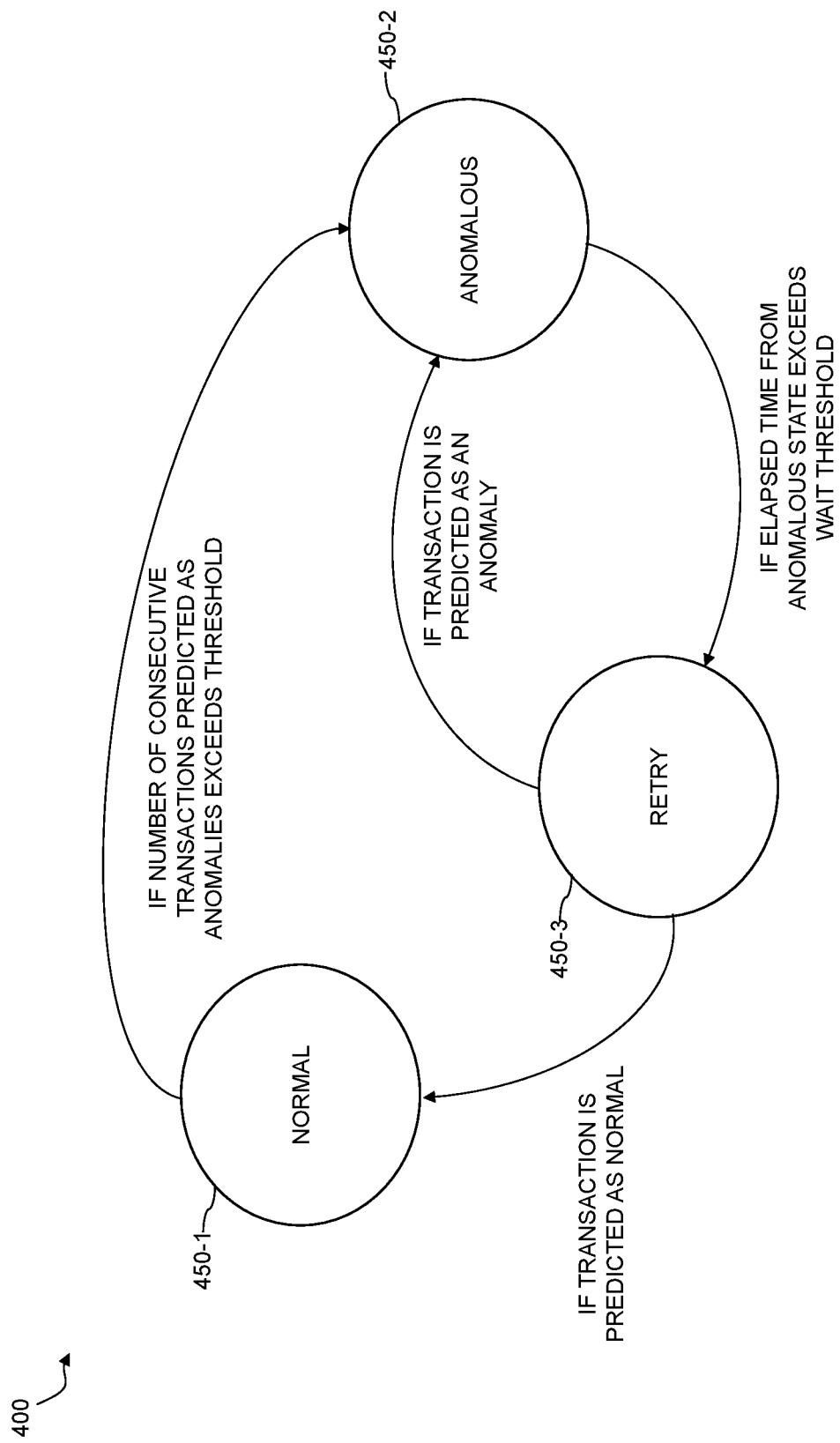
FIG. 4 depicts a process for state designation in an illustrative embodiment.

Referring to the state designation process 400 in FIG. 4, upon reaching a predetermined threshold number of anomalous transactions for a given API (in a non-limiting example, a default value can be 5 consecutive anomalous transactions), the state designation layer 141 of the broker engine 140 sets a state of the given API as ANOMALOUS 450-2. As seen in FIG. 4, the state was previously NORMAL 450-1. As a result of being designated as anomalous, the routing layer 143 forwards API requests for that API to a secondary API. According to an embodiment, if an API is in a designated ANOMALOUS state 450-2 for a predetermined period of time, the state designation layer 141 will commence a procedure to verify whether the API is in proper working order, or if the API issues remain. If the API is found to be in proper working order following verification, the state designation layer 141 will return the API to a normal state designation, where the routing layer 143 will send subsequent API requests to the API (i.e., primary API). For example, referring to FIG. 4, after a predetermined period of time of being in the designated ANOMALOUS state 450-2, the state designation layer 141 will change the state of the API to RETRY 450-3. When in the RETRY state 450-3, an incoming API request will be sent to the primary API and not the secondary API, and the transaction parameters will be analyzed by the anomaly prediction engine 130 to determine whether the transaction is normal or anomalous. If, during the RETRY state 450-3, the transaction for the primary API is predicted as anomalous by the anomaly prediction engine 130, the state designation layer 141 will change the state of the primary API back to ANOMALOUS 450-2 and wait for the predetermined period of time to again elapse before again switching to the RETRY state 450-3 and re-attempting to verify whether the API is in proper working order. When in the RETRY state 450-3, if a transaction for a primary API is predicted as normal by the anomaly prediction engine 130, the state designation layer 141 will change the state of the primary API to NORMAL 450-1 and the subsequent API requests will be forwarded to the primary API. The threshold number of consecutive anomalous transactions and the predetermined period of time to wait before verifying if an API is in working order may be configured by a user or default values can be used.

FIG. 5 illustrates example pseudocode 500 for implementing the state designation layer 141 of the broker engine 140. The pseudocode includes routines for changing the designated API states to and from NORMAL, ANOMALOUS and RETRY based on predictions made by the anomaly prediction engine 130. According to the pseudocode 500, API states are defined as 0=NORMAL, 1=ANOMALOUS, 2=RETRY, where the default=0.

According to the pseudocode 500, the routing layer 143 checks the state value and forwards API requests to primary or secondary endpoints based on the state value of the API. For example, if the API state=0, the primary API is called, and a response time of API is calculated based on a difference between the API request time and reply time. If response time exceeds a threshold API response time, the response time and other API parameters are passed to anomaly prediction engine 130, which uses the machine learning layer 131 to analyze the parameters and determine whether the transaction is anomalous. If anomalous, the anomaly counter 142 increments the anomaly count for the API, and sets a "last anomaly time" to a current time. Once the anomaly count reaches a threshold value, the API state is set to ANOMALOUS.

When in the anomalous state, if the time elapsed from the last anomaly time exceeds a threshold time, then the API state is set to RETRY, where the primary API is called in response to an API request. Similar to the initial process, a response time of primary API is calculated based on a difference between the API request time and reply time. If response time exceeds a threshold API response time, the response time and other API parameters are passed to anomaly prediction engine 130, which uses the machine learning layer 131 to analyze the parameters and determine whether the transaction is anomalous. If the transaction is determined to be anomalous, the anomaly counter 142 increments the anomaly count, and the API state is returned to ANOMALOUS. If the transaction is determined to be normal, the API state is returned to NORMAL, and the anomaly counter is reset to 0 for that API.

Figure 6:
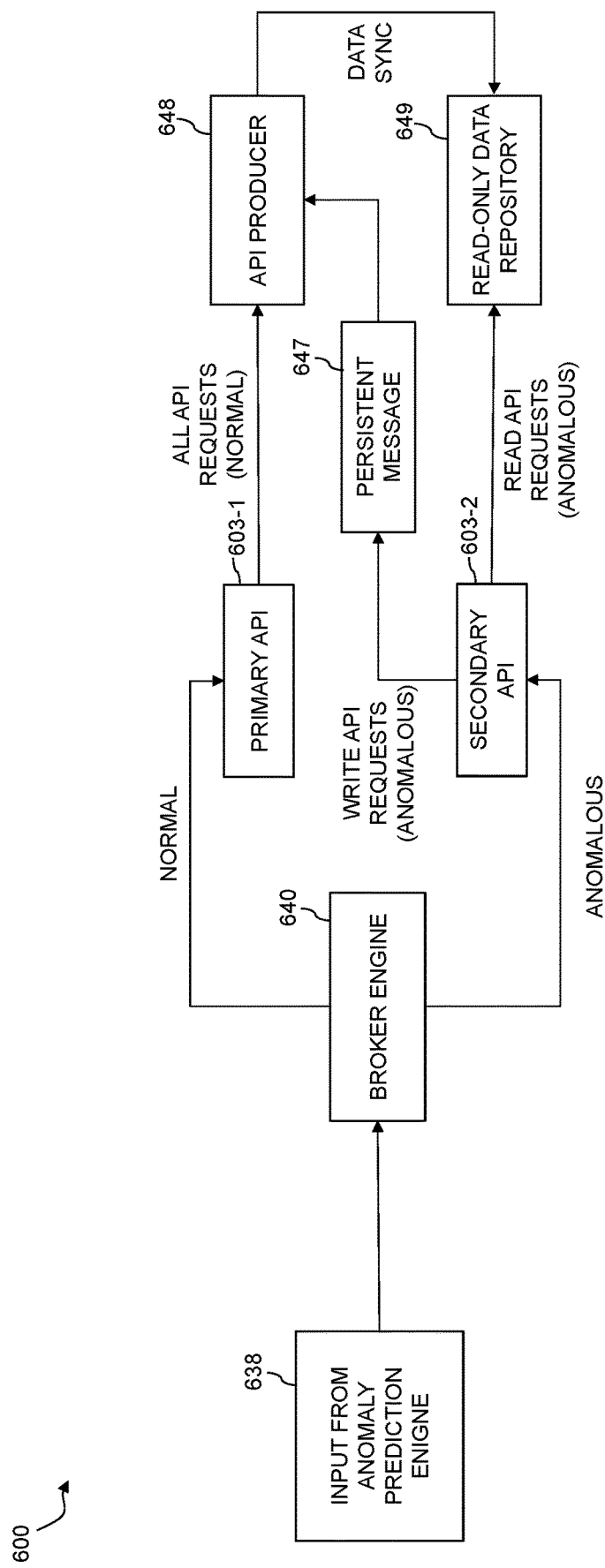
FIG. 6 depicts an operational flow for API routing and management of primary and secondary APIs in an illustrative embodiment.

Referring to the operational flow 600 in FIG. 6, based on input from the anomaly prediction engine 638 indicating whether transactions for given APIs are normal or anomalous, a broker engine 640 (the same or similar to broker engine 140) routes API calls for a given API to the given API (primary API 603-1) when the broker engine 640 designates the API as being in a NORMAL state, and to the secondary API 603-2 when the broker engine 640 designates the primary API as being in an ANOMALOUS state.

Secondary APIs for read operations (e.g., GET) can be created by the anomaly detection and resolution platform 110 by building read-only APIs from a read-only data repository 649. The read-only data repository 649 can be kept up to date by sourcing data from an API producer 648 on a periodic basis, which can be configurable based on delay tolerance. Other APIs that update data in a source system (e.g., PUT, POST, DELETE) use an asynchronous mechanism with persistence (persistent message layer 647) to guarantee transactional integrity.

According to an embodiment, the anomaly detection and resolution platform 110 is compatible with the vendor specific software, commands, formats and data of different APIs 103 and monitoring tools to which it is connected. The data collection engine 120 retrieves vendor specific data and metadata from APIs 103 and monitoring tools to which the anomaly detection and resolution platform 110 is connected. The vendor specific data and metadata may be in a native command format of the corresponding APIs 103 or monitoring tools from which the vendor specific data and metadata are retrieved.

According to one or more embodiments, the historical API parameters repository 123, read-only data repository 649 and other data repositories or databases referred to herein can be configured according to a relational database management system (RDBMS) (e.g., PostgreSQL). In some embodiments, the historical API parameters repository 123, read-only data repository 649 and other data repositories or databases referred to herein are implemented using one or more storage systems or devices associated with the anomaly detection and resolution platform 110. In some embodiments, one or more of the storage systems utilized to implement the historical API parameters repository 123, read-only data repository 649 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the anomaly detection and resolution platform 110, the data collection engine 120, anomaly prediction engine 130 and/or broker engine 140 in other embodiments can be implemented at least in part externally to the anomaly detection and resolution platform 110, for example, as stand-alone servers, sets of servers or other types of systems coupled to the network 104. For example, the data collection engine 120, anomaly prediction engine 130 and/or broker engine 140 may be provided as cloud services accessible by the anomaly detection and resolution platform 110.

The data collection engine 120, anomaly prediction engine 130 and/or broker engine 140 in the FIG. 1 embodiment are each assumed to be implemented using at least one processing device. Each such processing device generally comprises at least one processor and an associated memory, and implements one or more functional modules for controlling certain features of the data collection engine 120, anomaly prediction engine 130 and/or broker engine 140.

At least portions of the anomaly detection and resolution platform 110 and the elements thereof may be implemented at least in part in the form of software that is stored in memory and executed by a processor. The anomaly detection and resolution platform 110 and the elements thereof comprise further hardware and software required for running the anomaly detection and resolution platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, anomaly prediction engine 130, broker engine 140 and other elements of the anomaly detection and resolution platform 110 in the present embodiment are shown as part of the anomaly detection and resolution platform 110, at least a portion of the data collection engine 120, anomaly prediction engine 130, broker engine 140 and other elements of the anomaly detection and resolution platform 110 in other embodiments may be implemented on one or more other processing platforms that are accessible to the anomaly detection and resolution platform 110 over one or more networks. Such elements can each be implemented at least in part within another system element or at least in part utilizing one or more stand-alone elements coupled to the network 104.

It is assumed that the anomaly detection and resolution platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, anomaly prediction engine 130, broker engine 140 and other elements of the anomaly detection and resolution platform 110, and the elements thereof can each be implemented in the form of one or more LXCs running on one or more VMs. Other arrangements of one or more processing devices of a processing platform can be used to implement the data collection engine 120, anomaly prediction engine 130 and broker engine 140, as well as other elements of the anomaly detection and resolution platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the anomaly detection and resolution platform 110 to reside in different data centers. Numerous other distributed implementations of the anomaly detection and resolution platform 110 are possible.

Accordingly, one or each of the data collection engine 120, anomaly prediction engine 130, broker engine 140 and other elements of the anomaly detection and resolution platform 110 can each be implemented in a distributed manner so as to comprise a plurality of distributed elements implemented on respective ones of a plurality of compute nodes of the anomaly detection and resolution platform 110.

It is to be appreciated that these and other features of illustrative embodiments are presented by way of example only, and should not be construed as limiting in any way. Accordingly, different numbers, types and arrangements of system elements such as the data collection engine 120, anomaly prediction engine 130, broker engine 140 and other elements of the anomaly detection and resolution platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the anomaly detection and resolution platform can be offered to cloud infrastructure customers or other users as part of FaaS, CaaS and/or PaaS offerings.

Figure 7:
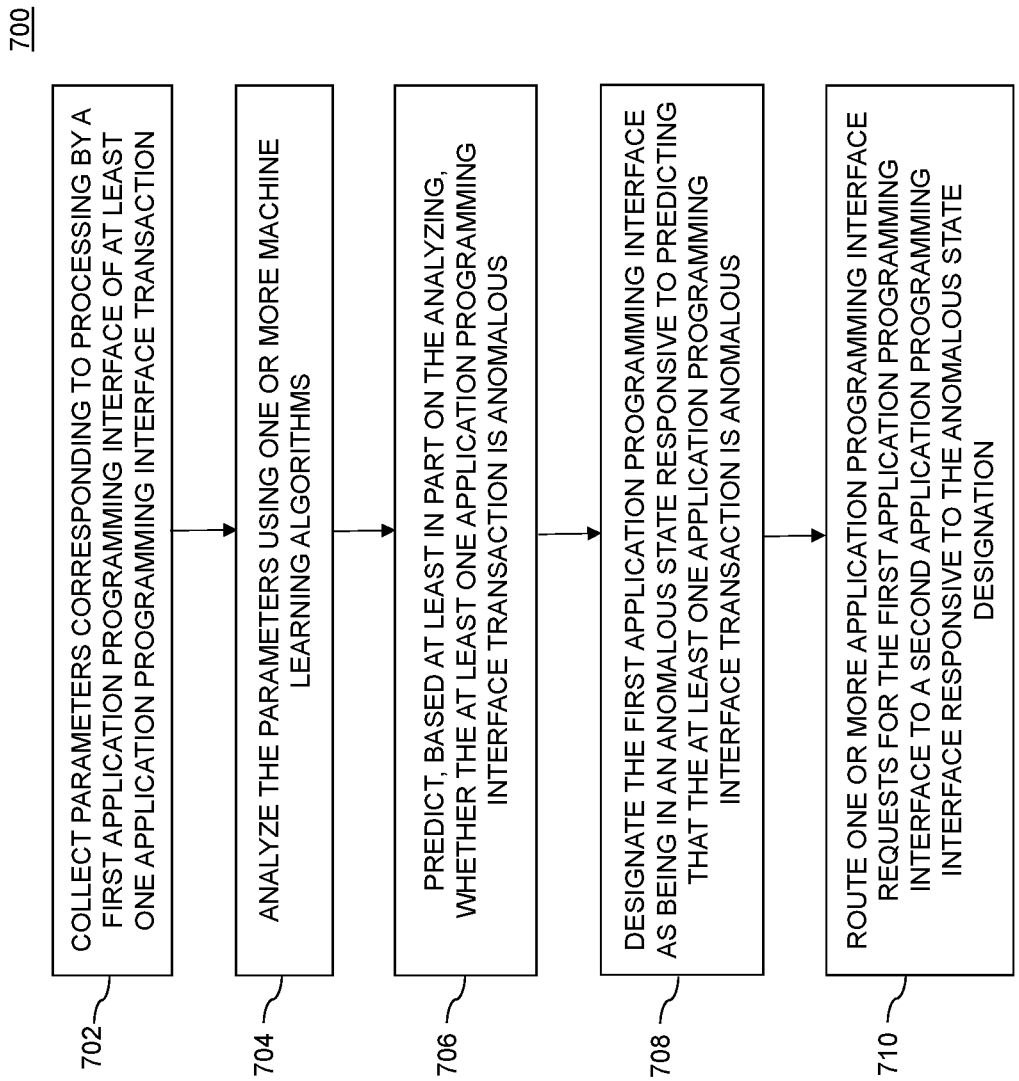
FIG. 7 depicts a process for API anomaly prediction and API routing according to an illustrative embodiment.

The operation of the information processing system 100 will now be described in further detail with reference to the flow diagram of FIG. 7. With reference to FIG. 7, a process 700 for anomaly detection and resolution as shown includes steps 702 through 710, and is suitable for use in the system 100 but is more generally applicable to other types of information processing systems comprising an anomaly detection and resolution platform configured for proactive detection and resolution of API issues.

In step 702, parameters corresponding to processing by a first API of at least one API transaction are collected. In step 704, the parameters are analyzed using one or more machine learning algorithms. The parameters comprise at least one of an API identifier, an API request time, and an API response time.

Step 706 comprises predicting, based at least in part on the analyzing, whether the at least one API transaction is anomalous. In step 708, the first API is designated as being in an anomalous state responsive to predicting that the at least one API transaction is anomalous. Before designating the first API as being in an anomalous state, a determination is made whether a threshold number of API transactions of a plurality of API transactions associated with the first API have been predicted as anomalous. The threshold number comprises a consecutive number of API transactions that have been predicted as anomalous. In step 710, API requests for the first API are routed to a second API responsive to the anomalous state designation. In one or more embodiments, data corresponding to operation of the first API is stored, and the second API is generated based, at least in part, on the stored data.

The one or more machine learning algorithms utilize an unsupervised learning technique to detect one or more outlier parameters of the parameters, and comprise, for example, an isolation forest algorithm. The one or more machine learning algorithms are trained with training data comprising historical parameter data.

According to an embodiment, the anomalous state designation of the first API is verified by routing at least one API request to the first API instead of the second API, and collecting additional parameters corresponding to processing by the first API of an API transaction associated with the at least one API request. The additional parameters are analyzed using the one or more machine learning algorithms, and based at least in part on the analyzing, a prediction is made whether the API transaction associated with the at least one API request is anomalous. The verifying is performed after a predetermined time period of routing the one or more API requests for the first API to the second API.

The anomalous state designation of the first API is maintained responsive to predicting that the API transaction associated with the at least one API request is anomalous. The anomalous state designation of the first API is changed to a normal state designation responsive to predicting that the API transaction associated with the at least one API request is not anomalous. Subsequent API requests for the first API are routed to the first API responsive to the normal state designation.

It is to be appreciated that the FIG. 7 process and other features and functionality described above can be adapted for use with other types of information systems configured to execute anomaly detection and resolution services in an anomaly detection and resolution platform or other type of platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an anomaly detection and resolution platform as disclosed herein can provide a number of significant advantages relative to conventional arrangements. For example, the anomaly detection and resolution platform uses machine learning to proactively predict API outages to minimize impact on applications relying on API operations. The embodiments advantageously leverage an unsupervised learning approach and machine learning models to detect anomalies in API transactions and accurately predict API outages. By predicting an upcoming outage before it occurs, the embodiments facilitate routing of API requests to different APIs and eliminate the effects of outages by addressing them prior to their actual occurrence.

As an additional advantage, the embodiments implement a broker engine utilizing a circuit breaker arrangement and which tracks API states. The broker engine automatically routes API requests to alternate API end points, thus seamlessly handling underlying issues without impacting users.

Outages are predicted using advanced anomaly detection based on API transaction parameters. Responsive to a predicted outage, the embodiments manage routing of API requests from a primary APIs to secondary (e.g., failover) APIs, while maintaining transactional integrity, and quality of service (QoS).

By leveraging machine learning for anomaly detection, the embodiments monitor various API parameters including, for example, API metrics such as, for example, the time it takes for an API to respond to a request. By measuring normal parameter values, the machine learning model detects anomalies when parameter values deviate from normal values. Based on identification of an anomaly, a decision can be made to switch to a secondary API before an outage of the primary API occurs. While the issues in the primary API are investigated, operations can flow through the secondary API uninterrupted, maintaining continuity. Since the embodiments address API failures before they can occur, the embodiments advantageously eliminate the need for API consuming applications to have awareness of API performance issues and build failover mechanisms to address API outages.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the anomaly detection and resolution platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an anomaly detection and resolution platform in illustrative embodiments. These and other cloud-based systems in illustrative embodiments can include object stores.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
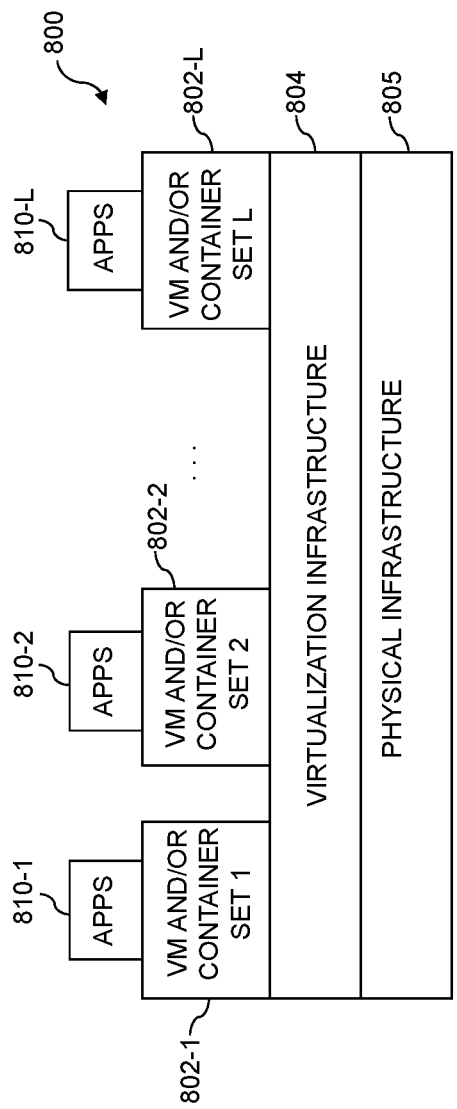
FIGS. 8 and 9 show examples of processing platforms that may be utilized to implement at least a portion of an information processing system according to illustrative embodiments.
Figure 9:
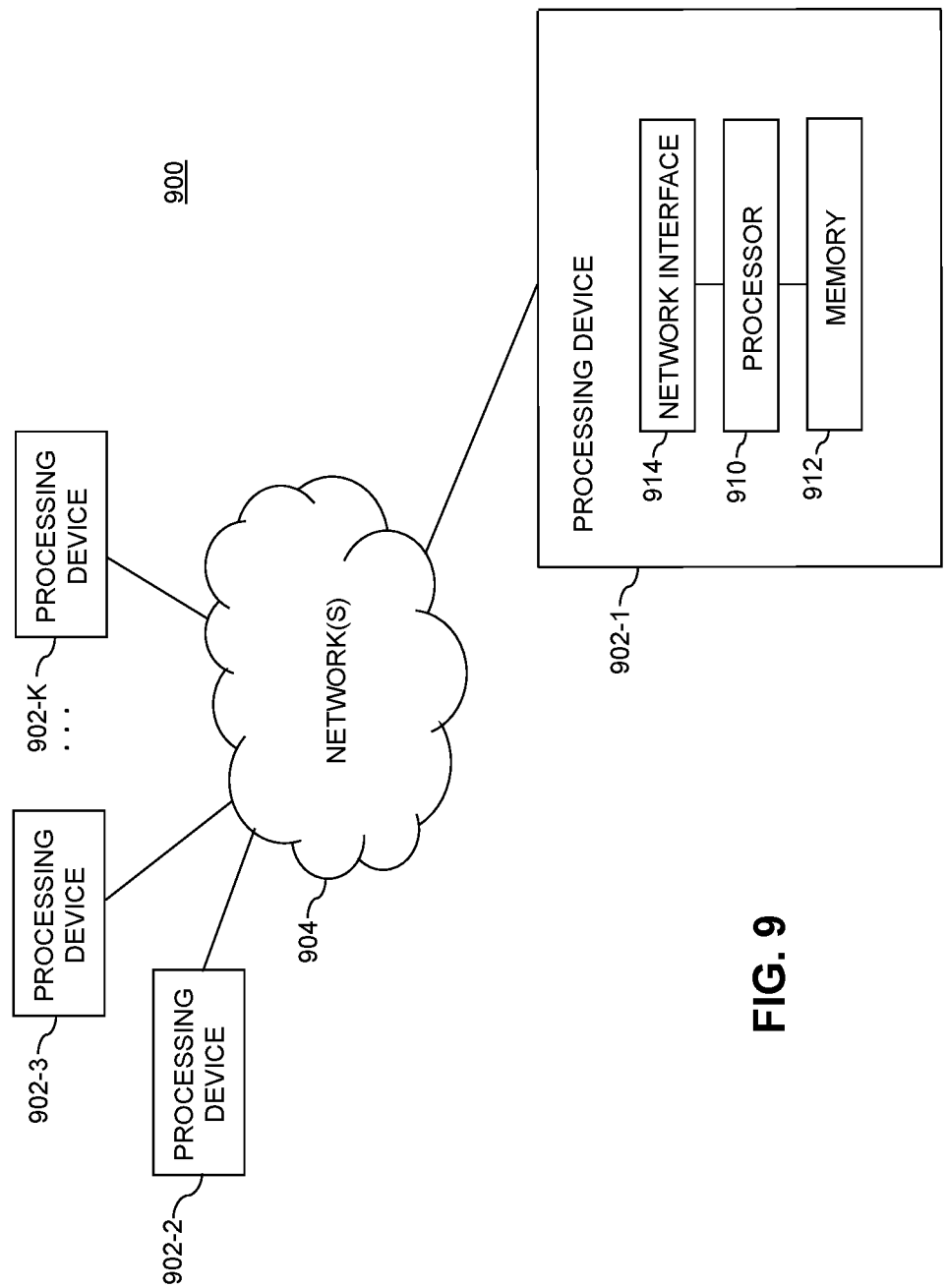

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the anomaly detection and resolution platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and anomaly detection and resolution platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   collecting parameters corresponding to processing by a first application programming interface of at least one application programming interface transaction;
   analyzing the parameters using one or more machine learning algorithms;
   predicting, based at least in part on the analyzing, whether the at least one application programming interface transaction is anomalous;
   designating the first application programming interface as being in an anomalous state responsive to predicting that the at least one application programming interface transaction is anomalous; and
   routing one or more application programming interface requests for the first application programming interface to a second application programming interface responsive to the anomalous state designation;
   wherein the second application programming interface is configured based on functionality of the first application programming interface to enable the second application programming interface to operate and process the one or more application programming interface requests in place of and with the functionality of the first application programming interface;
   wherein the steps of the method are executed by a processing device operatively coupled to a memory.

2. The method of claim 1, further comprising determining whether a threshold number of application programming interface transactions of a plurality of application programming interface transactions associated with the first application programming interface have been predicted as anomalous before designating the first application programming interface as being in an anomalous state.

3. The method of claim 2, wherein the threshold number of application programming interface transactions comprises a consecutive number of application programming interface transactions that have been predicted as anomalous.

4. The method of claim 1, wherein the parameters comprise at least one of an application programming interface identifier, an application programming interface request time, and an application programming interface response time.

5. The method of claim 1, wherein the one or more machine learning algorithms utilize an unsupervised learning technique to detect one or more outlier parameters of the parameters.

6. The method of claim 5, wherein the one or more machine learning algorithms comprise an isolation forest algorithm.

7. The method of claim 6, further comprising training the one or more machine learning algorithms with training data comprising historical parameter data.

8. The method of claim 1, further comprising verifying the anomalous state designation of the first application programming interface, wherein the verifying comprises:
   routing at least one application programming interface request to the first application programming interface instead of the second application programming interface;
   collecting additional parameters corresponding to processing by the first application programming interface of an application programming interface transaction associated with the at least one application programming interface request;
   analyzing the additional parameters using the one or more machine learning algorithms; and
   predicting, based at least in part on the analyzing, whether the application programming interface transaction associated with the at least one application programming interface request is anomalous.

9. The method of claim 8, further comprising maintaining the anomalous state designation of the first application programming interface responsive to predicting that the application programming interface transaction associated with the at least one application programming interface request is anomalous.

10. The method of claim 8, further comprising changing the anomalous state designation of the first application programming interface to a normal state designation responsive to predicting that the application programming interface transaction associated with the at least one application programming interface request is not anomalous.

11. The method of claim 10, further comprising routing subsequent application programming interface requests for the first application programming interface to the first application programming interface responsive to the normal state designation.

12. The method of claim 8, wherein the verifying is performed after a predetermined time period of routing the one or more application programming interface requests for the first application programming interface to the second application programming interface.

13. The method of claim 1, further comprising:
storing data corresponding to operation of the first application programming interface; and
generating the second application programming interface based, at least in part, on the stored data.

14. An apparatus comprising:
a processing device operatively coupled to a memory and configured to:
collect parameters corresponding to processing by a first application programming interface of at least one application programming interface transaction;
analyze the parameters using one or more machine learning algorithms;
predict, based at least in part on the analyzing, whether the at least one application programming interface transaction is anomalous;
designate the first application programming interface as being in an anomalous state responsive to predicting that the at least one application programming interface transaction is anomalous; and
route one or more application programming interface requests for the first application programming interface to a second application programming interface responsive to the anomalous state designation;
wherein the second application programming interface is configured based on functionality of the first application programming interface to enable the second application programming interface to operate and process the one or more application programming interface requests in place of and with the functionality of the first application programming interface.

15. The apparatus of claim 14, wherein the processing device is further configured to determine whether a threshold number of application programming interface transactions of a plurality of application programming interface transactions associated with the first application programming interface have been predicted as anomalous before designating the first application programming interface as being in an anomalous state.

16. The apparatus of claim 15, wherein the threshold number of application programming interface transactions comprises a consecutive number of application programming interface transactions that have been predicted as anomalous.

17. The apparatus of claim 14, wherein the processing device is further configured to verify the anomalous state designation of the first application programming interface, wherein, in verifying, the processing device is configured:
route at least one application programming interface request to the first application programming interface instead of the second application programming interface;
collect additional parameters corresponding to processing by the first application programming interface of an application programming interface transaction associated with the at least one application programming interface request;
analyze the additional parameters using the one or more machine learning algorithms; and
predict, based at least in part on the analyzing, whether the application programming interface transaction associated with the at least one application programming interface request is anomalous.

18. An article of manufacture comprising a non-transitory processor-readable storage medium having stored therein program code of one or more software programs, wherein the program code when executed by at least one processing device causes said at least one processing device to perform the steps of:
collecting parameters corresponding to processing by a first application programming interface of at least one application programming interface transaction;
analyzing the parameters using one or more machine learning algorithms;
predicting, based at least in part on the analyzing, whether the at least one application programming interface transaction is anomalous;
designating the first application programming interface as being in an anomalous state responsive to predicting that the at least one application programming interface transaction is anomalous; and
routing one or more application programming interface requests for the first application programming interface to a second application programming interface responsive to the anomalous state designation wherein the second application programming interface is configured based on functionality of the first application programming interface to enable the second application programming interface to operate and process the one or more application programming interface requests in place of and with the functionality of the first application programming interface.

19. The article of manufacture of claim 18, wherein the program code causes said at least one processing device to further perform the step of determining whether a threshold number of application programming interface transactions of a plurality of application programming interface transactions associated with the first application programming interface have been predicted as anomalous before designating the first application programming interface as being in an anomalous state.

20. The article of manufacture of claim 19, wherein the threshold number of application programming interface transactions comprises a consecutive number of application programming interface transactions that have been predicted as anomalous.

* * * * *